G. GORTON.
CUTTING OFF MACHINE AND THE LIKE.
APPLICATION FILED DEC. 1, 1915.
1,284,315.
Patented Nov. 12, 1918.
4 SHEETS—SHEET 1.
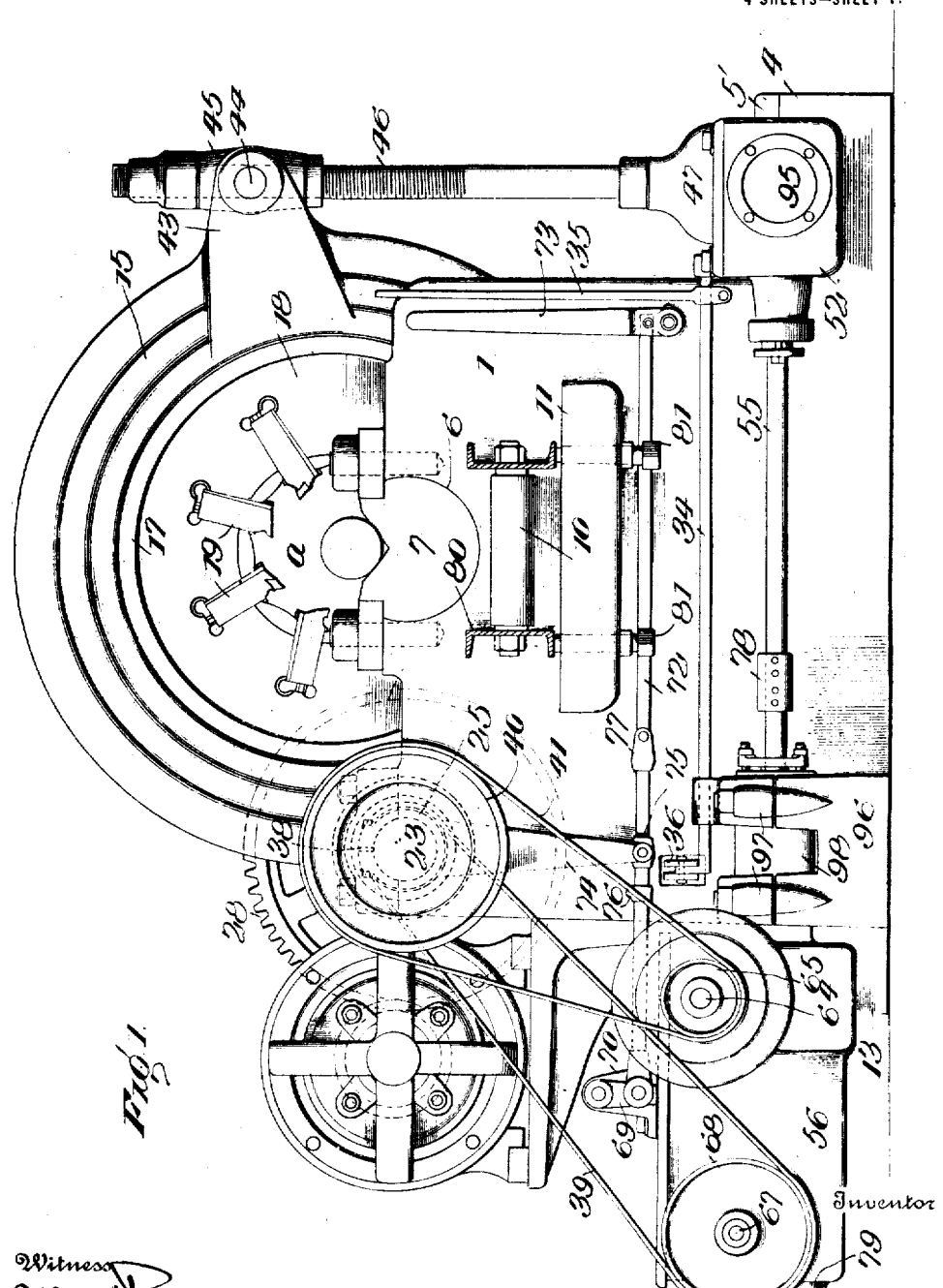

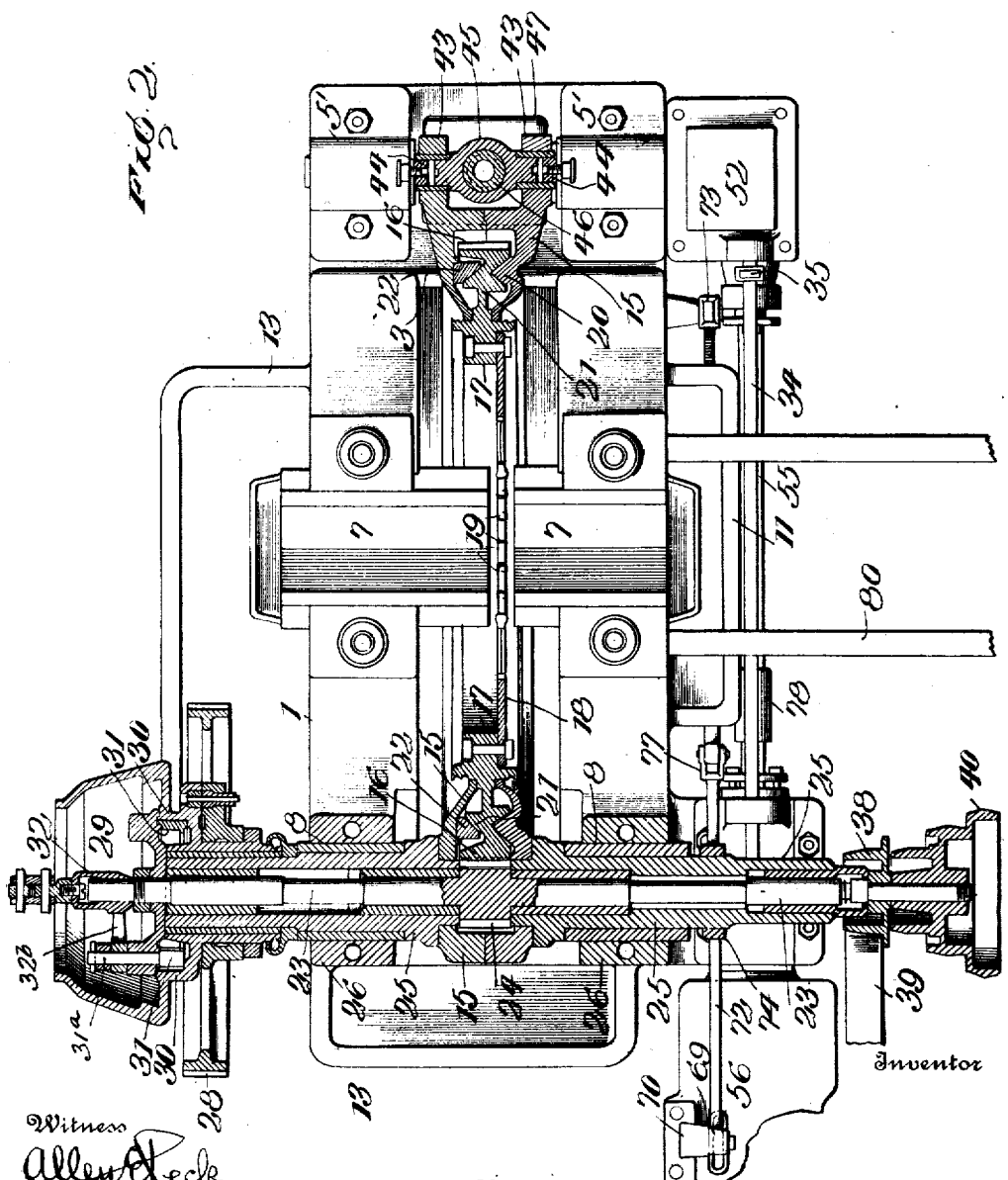

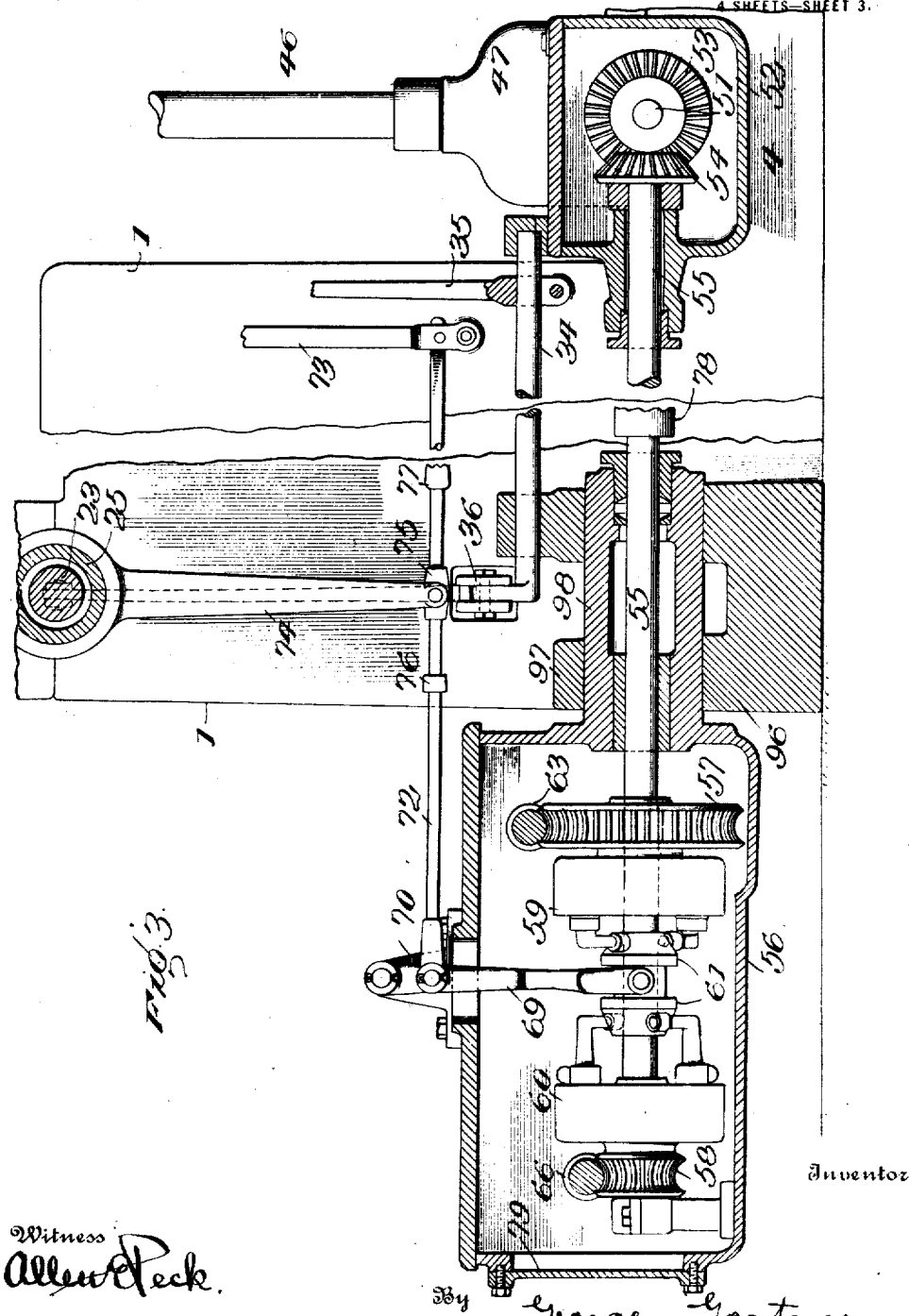

G. GORTON.
CUTTING OFF MACHINE AND THE LIKE.
APPLICATION FILED DEC. 1, 1915.
1,284,315.
Patented Nov. 12, 1918.
4 SHEETS—SHEET 4.
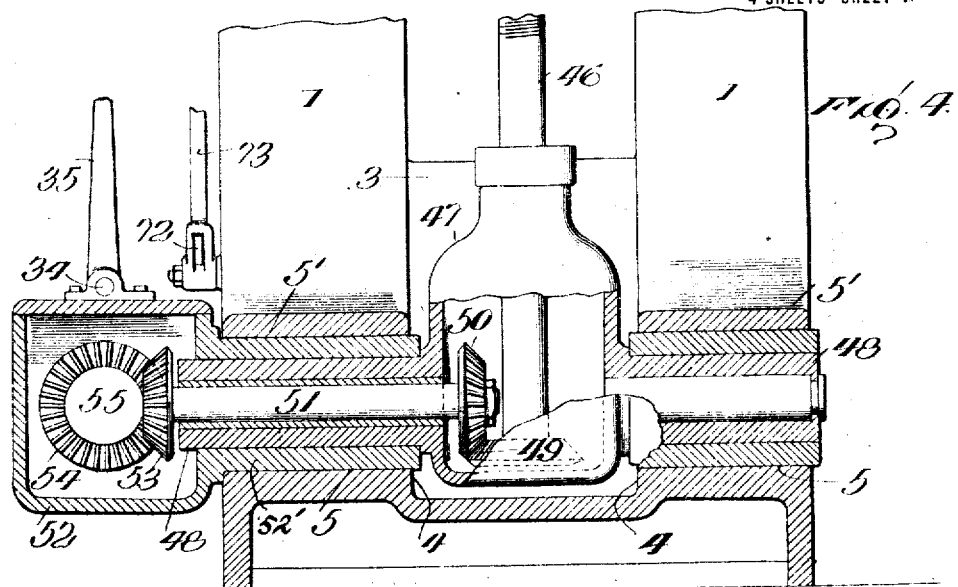
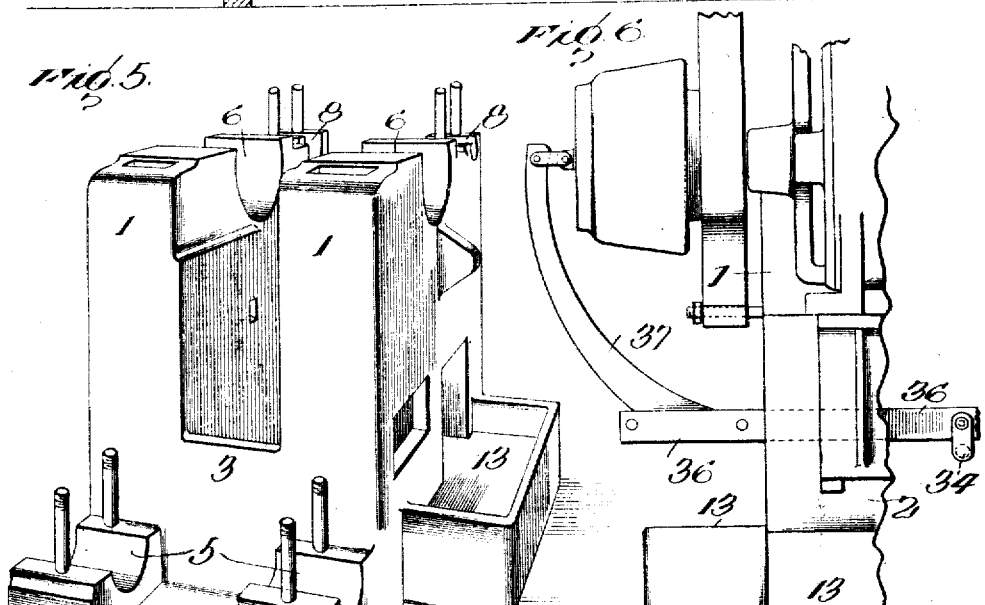
Witness
Albert Peck
Inventor
George Gorton
By
Hubert E Peck
Attorney

UNITED STATES PATENT OFFICE.

GEORGE GORTON, OF RACINE, WISCONSIN.

CUTTING-OFF MACHINE AND THE LIKE.

1,284,315.  Specification of Letters Patent.  Patented Nov. 12, 1918.

Application filed December 1, 1915. Serial No. 64,557.

*To all whom it may concern:*

Be it known that I, GEORGE GORTON, a citizen of the United States, residing at Racine, in the county of Racine and State of Wisconsin, have invented certain new and useful Improvements in Cutting-Off Machines and the like, of which the following is a specification.

This invention involves certain improvements in and relating to cutting off machines and the like; and the objects and nature of the invention will be readily understood by those skilled in the art in the light of the following explanation of the accompanying drawings illustrating what I now believe to be the preferred embodiment or mechanical expression of the invention from among other forms, constructions and arrangements within the spirit and scope of the claims.

It is an object of the invention to increase the efficiency and durability of cutting off machines and to reduce vibration and wear to the minimum.

A further object of the invention is to provide improvements in the operation and mounting of the feed carriages or heads of cutting off machines of the heavy duty "Gorton" type.

A further object of the invention is to provide improvements in feed mechanism for swinging heads or feed carriages of cutting off machines of the "Gorton" type.

A further object of the invention is to provide improvements in the saw blade drive and mounting of cutting off machines of the "Gorton" type.

A further object of the invention is to provide certain improvements in details and arrangements of parts for the production of a highly advantageous efficient cutting off machine.

The invention consists in certain novel features in construction and in arrangements and combinations as more fully and particularly set forth and specified hereinafter.

Referring to the accompanying drawings:—

Figure 1, is a side elevation of a machine embodying my invention, the clamping mechanism not being shown.

Fig. 2, is a horizontal section taken through the cutting off head and its mounting.

Fig. 3, is a detail vertical longitudinal section through certain parts of the feed works.

Fig. 4, is a vertical cross section through certain portions of the feed works.

Fig. 5, is a detail perspective of the base.

Fig. 6, is a detail view showing a portion of the means for operating the cone of the main clutch.

In the particular example illustrated, I show the machine provided with a heavy base, the lower portion of which forms a tank to catch and receive the liquid with which the cutters of the blade are flooded while working on the stock, and also to receive the chips from which the cooling liquid is separated so that the liquid in the tank can constitute the supply from which liquid is pumped to flood the cutters while at work. The base is shown formed with a pair of parallel vertical spaced elevated longitudinal or side walls 1, joined by vertical end walls 2, 3, the end wall 3, being reduced in height to leave a clear upper space between the adjacent ends of the side walls, in which the swingable cutting head or carriage can move vertically as hereinafter explained. To the exterior of end wall 3, the base is formed with a depressed end extension embodying a pair of low vertical side walls 4, formed with alined transverse preferably bored semi-cylindrical bearing sockets 5, in their top edge portions to receive the trunnions of a gear box of the carriage or head feed screw as described hereinafter.

The usually straight horizontal top edges of the main side walls 1, are preferably formed with alined bored semi-cylindrical sockets 6, extending transversely across said walls about at the central portions of their lengths, to receive the stock-receiving jaw blocks or troughs 7. The end portions of the top edges of said main side walls at the opposite end of the base from wall 3, are formed with alined semi-cylindrical preferably bored bearing sockets or holes 8, to receive the trunnions of the swingable feed carriage or cutting off head, as hereinafter explained. Where these various alined sockets are bored in a base composed of a single casting, remarkable accuracy in spacing and alinement is assured and great economy in production of the base ready for accurate assembling of the working parts thereon, is attained, as well as in assembling the working parts on the base.

At its front side (in the direction of feed of the stock to the cutter blade) the base is usually cast with a lug 10, to which the rear ends of the rails of the stock rack can be bolted, and a distance below said lug with an outwardly projecting pan or shelf 11, immediately below the rear ends of said rails and on which they can rest. The lug and shelf are arranged at the central upper portion of the front side of the base usually just below the stock jaw block or trough in the front side wall of the base. The base can be cast with lateral bottom open-top pan-like enlargements 13, communicating with the tank-like interior of the base through lateral openings in side and end walls thereof. The rear side enlargement can receive a drip pan, and the rear end enlargement can receive the suction inlet of the pump that forces the cooling liquid onto the cutters at work.

However, my invention is not limited to various features of the base described and shown.

The cutting off head or feed carriage of the machine comprises an annular vertically arranged box, housing or gear case 15, approximately trough-like or U-shape in radial cross section, which contains a saw blade carrying and driving annulus or rotor at its periphery having gear teeth to form a spur gear 16, and at its center having an open-center drum or hub 17, arranged concentrically within the open center of the gear case to receive and drive the saw blade 18 having a center stock or work-receiving opening a, and an annular series of renewable cutters 19, arranged around said opening to operate on the stock extending therethrough. The drum or hub of the blade driving rotor is provided with an internal seat against which the peripheral portion of the blade fits and to which it is removably secured by suitable bolts or other desirable means so that the blade spans the otherwise open center of the hub or drum.

The main bearings of the blade carrying and driving rotor are provided by and between the opposite side faces of the annular web of said rotor and the inner sides of the opposite side walls of the gear case.

In the instance shown, one side wall of the gear casing is formed with an annular V bearing rib 20, fitting in a correspondingly formed annular V bearing groove in the adjacent side face of said web, while the opposite side face of said web is formed with an annular conical bearing surface 21, while the case is provided with a longitudinally adjustable bearing ring 22, having a conical bearing surface engaging surface 21, of the rotor.

The gear casing is preferably liquid tight to contain a quantity of liquid lubricant in which the rotor and its driving gear teeth travel.

The cutter-blade-carrying and driving rotor is rotated in the gear case by the pinion shaft 23, preferably forming the main shaft of the machine. This shaft is provided with a pinion 24, inclosed within the gear case and meshing with the gear teeth 16, of said rotor. This shaft extends transversely and horizontally through the peripheral or edge portion of the gear case beyond the periphery of the rotor therein and its longitudinal axis is concentric with the horizontal axis on which the feed carriage or cutting off head swings vertically on its feed and return strokes. The gear case is formed with opposite side alined openings for this shaft, and from these openings alined longitudinally hollow cylindrical trunnions 25, extend in opposite directions. The longitudinal axis of these trunnions constitutes the axis on which the cutting off head swings on its feed and return strokes, and said trunnions are fixedly bolted or otherwise secured to said gear case to form the pivot or axis on which the same swings, and are internally provided with suitable bearings for said pinion shaft which extends longitudinally therethrough and rotates therein. These trunnions are mounted to rotate in suitable bearing sleeves or bushings provided therefor in the bearing sockets 8, in the top edges of the base main walls, and are confined therein by caps 26, suitably bolted to said top edges of the base and extending over said trunnions. The trunnions are elongated to extend transversely across and beyond said walls of the base, while the pinion shaft is elongated to project beyond the outer ends of the trunnions, at its rear end to receive shaft driving means, and at its front end to receive power transmitting means from which the power is secured for driving the feed works.

On the extended end of the rear trunnion, a shaft driving gear 28, is loosely mounted to rotate freely on the exterior of the trunnion end. The power for driving the rotary blade as well as swinging the feed carriage or head is applied to this gear 28, from any suitable motor or other source of power. The rear end of the pinion shaft that projects beyond said rear trunnion carries and is provided with the main clutch 29, of the machine, by means of which said shaft is thrown into and from operative connection with this gear through the medium of an annular shoe or flange 30, constantly driven by said gear, and an expansive clutch member 31, carried by and adapted to rotate the shaft and normally contracted from operative power transmitting engagement with said shoe.

A sliding cone 32, is arranged on the projecting end of the shaft to apply and release the clutch member 31, through the medium of a rock shaft 31ª having an arm 31ᵇ bearing against the cone. Those skilled in the art will understand that when the cone is slipped along the shaft in one direction the shaft will be operatively coupled to the driving gear and the shaft will be thereby rotated, and when the cone is moved in the opposite direction, the clutch will be operated to release the driving gear and the operative driving connection to the shaft will be disconnected.

Any suitable means can be provided for controlling and shifting the cone to stop and start the machine, although in the present instance, I show rock shaft 34, at the front of the machine having upright handle 35, and coupled to a slide 36, to longitudinally move the same either forwardly or rearwardly according to the direction in which the shaft is rocked. This slide extends transversely through and is slidable in the base and at the rear of the base is provided with an arm 37, extending upwardly and coupled to the cone to move the same in and out with the slide.

The front trunnion of the carriage or head is projected forwardly a distance in advance of the front side wall of the base to support the projected front end of the pinion shaft. The front end of said shaft that projects forwardly beyond said trunnion is provided with a pulley 38, fast thereon and receiving belt 39, for driving the mechanism for swinging the carriage or head on its return stroke, and also with cone pulley 40, fast thereon and receiving belt 41, for driving the mechanism that actuates the carriage or head on its feed stroke.

At a point diametrically opposite its trunnions, the free end of the carriage or head is provided with a pair of similar spaced radially projecting arms 43, strongly constructed and preferably integral with the gear case of said head. These arms are formed with horizontal alined bearing openings extending therethrough and receiving the opposite lateral trunnions 44, of an elongated vertical screw threaded rockable nut 45, arranged vertically between said arms. The trunnions are rigid with and support the nut and are mounted to rotate or turn in said bearings in the arms so that the nut can freely rock vertically between the arms as the head swings vertically. This nut constitutes the feed nut for the head and it receives and meshes with the thread of the vertically-disposed rotary feed screw 46. This screw extends through and is rotatable in said nut in either direction to swing the head or carriage vertically on its trunnions to perform its feed and return strokes. The screw is arranged beyond the base end wall 3, and rises from a vertically-rockable gear box 47, arranged transversely of and between the two low vertical walls 4, and having projecting end trunnions 48 that occupy and are mounted to turn or rotate in the bearing sockets 5, of said walls and are preferably longitudinally hollow.

Caps 5' are bolted on the walls 4 and confine the trunnions in the bearing sockets 5. The lower end of the screw enters said box and is mounted to rotate therein, the box being provided with suitable bearings for the shaft. Within the box, the screw is provided with a driving gear 49, meshing with and driven by a gear 50, also arranged within the box and carried and driven by a shaft 51. This shaft 51 is arranged and mounted within the box and extends longitudinally thereof, and centrally through the front trunnion of the box and projects forwardly therefrom into another gear box 52, arranged at the front side of the depressed end extension of the base in which the rockable gear box 47 is mounted. The cross shaft 51 is provided with gear 53, within the box 52, meshing with and driven by gear 54, also within said box, and carried and driven by longitudinal main drive shaft 55 of the feed works, which shaft is arranged in front of the lower part of the base, and extending to the opposite end of the base and there entering and mounted in the feed works gear case 56, said case being secured to and supported by the base and arranged at the rear end front corner thereof and a distance below the projecting front trunnion of the feed carriage or head and the projecting end of the main or pinion shaft of the machine and the pulleys thereon. The main feed works shaft 55, is suitably mounted in the case 56, and extends throughout the length thereof and is provided in said case with a worm gear 57, for rotating the shaft to actuate the cutter head or carriage on its downward or feed stroke, and with another worm gear 58, for rotating said shaft in the opposite direction to actuate said cutter head on its upward or return stroke. These worm gears are spaced a distance apart and are loosely mounted on said shaft to rotate independently thereof except as one or the other is coupled thereto by suitable clutch mechanisms.

A clutch mechanism 59, fast on the shaft and rotating therewith is arranged beside the gear 57, and is operative to couple said gear 57, to said shaft for driving the same and to release said gear from operative connection with said shaft. Another clutch mechanism 60, is arranged beside the gear 58 and is fast on and rotating with the shaft to couple said gear 58, to and to release the same from said shaft. These clutch mechanisms are so arranged and operated that both cannot at the same time operatively couple their said gears to the shaft, and this is controlled by a single double cone 61, arranged between the two clutch mechanisms and slidable longitudinally on said shaft. A neutral position is provided for said cone, and when the cone is in said neutral position it will be out of operative engagement with both clutches and hence both gears 57, 58 will rotate freely on said shaft which will then remain stationary. The cone can be moved in one direction to cause one clutch mechanism to operatively couple its gear to drive the shaft in one direction, or can be moved in the opposite direction to release said gear from the shaft and to couple the other gear thereto to rotate the shaft in the opposite direction, inasmuch as the two gears 57, 58, are constantly rotating in opposite directions and are constantly coupled to their driving means during the operation of the machine and while the main clutch of the machine is in operative adjustment.

The cutter head feed stroke gear 57, is constantly driven by a meshing worm 63, in the feed works case and carried by a cross shaft 64, mounted in said case and at the exterior thereof provided with a cone pulley 65, receiving and driven by the belt 41, from cone pulley 40, on the pinion or main drive shaft of the machine.

The cutter head return stroke gear 58, is constantly driven in the opposite direction from gear 57 by meshing worm 66, in said case and carried by cross shaft 67, mounted in the case and at the exterior thereof provided with pulley 68, receiving and driven by the belt 39, from pulley 38 on said main drive shaft.

Any suitable mechanism can be provided for shifting the double cone to neutral position or to throw either clutch mechanism into operative position, although in the present instance, I show a swinging vertically arranged forked lever or fork 69 for this purpose at its lower free end operatively engaging the cone, and at its upper end fulcrumed to a bracket 70, fixed to and rising from the box. The fork depends from said bracket through a slot in the top of the feed works case. The fork is swung to perform its work, above noted, by a horizontal connecting rod 72, at its rear end pivotally joined to the fork 69, below the fulcrum thereof and above the case top, and at its front end pivotally joined to an upright hand lever 73, arranged at the front end of the machine and at its lower end fulcrumed to the front side of the machine base, so that the rod 72, will be moved longitudinally to operate the fork in the desired direction, by swinging the hand lever in the same direction. It will also be noted that in the present example, the connecting rod 72, is arranged longitudinally of the base and in front thereof and a distance below the projecting front trunnion of the cutter head.

The connecting rod 72, can be automatically operated by the cutter head or feed carriage as it reaches its limit of movement in either direction, to throw one clutch mechanism out and the other in and thereby reverse the direction of rotation of the main shaft of the feed works and hence reverse the direction of swing of the cutter head, or else to throw the double cone to neutral position and thereby stop the rotation of the said feed works shaft and the swing of the cutter head. In this instance, I show for this purpose, a radial arm 74, carried by, depending from and swinging with the projecting front trunnion of the cutter head, and at its lower end loosely and pivotally coupled to a sleeve 75, confined to and longitudinally slidable on said connecting rod between suitably positioned stops 76, 77, on said rod and adapted to move the rod longitudinally to swing the cone operating fork, by engagement between said sleeve 75, and one or the other of said stops. Either or both of said stops can be adjusted longitudinally of the rod to predetermine the angle of the cutter head above the horizontal at which the arm 74, will engage a stop to throw the cutter head return gear out of action, and the angle of the cutter head below the horizontal at which said arm will engage the other stop to throw the cutter feed gear out of action.

The main drive shaft 55 of the feed works is preferably made in sections, the rear section thereof being arranged in the case 56, and terminating at or near the front end thereof. This rear section of the shaft is removably united to the front section of the shaft by any suitable coupling 78. The end of the case 56, is formed with a large opening through which the rear section of the shaft 55, can be removed longitudinally when released by the coupling 78. This opening is of sufficient size to permit removal of the shaft section with the gears 57, 58, and clutches 59, 60, remaining thereon. The case is provided with a removable cap or closure 79, for said end opening adapted to tightly close the same inasmuch as said case is arranged to contain oil for approximately submerging the gears, etc., located therein. The gear boxes 47, 52, are also adapted to contain oil in which the gears therein rotate.

In the example illustrated, I show the gear box 52, supported and rigidly held by a trunnion-like tubular extension 52′, integral therewith, and fitted into the front socket 5, and fixedly clamped therein by the cap 5′.

The front trunnion 48, of the rocking gear box 47, extends through and rocks in said extension 52'.

I show the case 56, fixedly secured to and supported by the base, through the medium of a trunnion-like tubular extension 98, integral with said case and projecting rearwardly therefrom in longitudinal continuation thereof. This extension 98, is clamped tightly in a socket or groove in the top edge of a projection 96, from the front of the base, by a cap 97, bolted to said projection. The shaft 55, extends longitudinally through said extension 98.

It will be noted that the cutter head is arranged between the side walls of the machine base, with the axis on which it swings arranged transversely of the top portions of the rear ends of said walls, and with the front free end of said head projecting forwardly beyond said walls to receive the vertically-disposed feed screw. Said head swings vertically between said walls, and the rotary blade is arranged approximately centrally within said head. The stock rests transversely across the top edges of said walls and extends through the center opening of the blade.

When the cutter head is approximately at its limit of upward movement to permit forward feeding of the stock through the blade opening, the cutters at the lower edge of the opening are just below the path of the stock through the opening and the diameter of the head that includes the axis on which the head swings and the feed nut at the free end of the head, is inclined upwardly and forwardly. The stock however, is held in approximately the same horizontal plane as that of the axis on which the cutter head swings, whereby certain advantages are attained.

When the stock has been adjusted through the cutter blade and secured in the desired position, the cutter head is started on its downward feed stroke and the cutters of the rotary blade will work down through and sever the stock so that when the stock has been severed and the cutter head has completed its feed stroke, its diameter including the axis on which the head swings and the feed nut will be approximately horizontal.

During the swinging movement of the cutter head, the feed nut rocks on its trunnions as the angle between the feed screw and cutter head changes, and the feed screw also rocks from the trunnions of its bottom gear box as a center, said box rocking with the screw.

Those skilled in the art will understand that the cooling liquid discharged on the cutters and stock during the cutting operation flows back into the bottom of the base and that the chips also fall thereinto or else drop into a chip pan arranged in the bottom rear enlargement of the base.

The shelf 11, can also form a pan to receive cooling and liquid chips.

The gear box at the front corner of the base and inclosing the gears uniting the main shaft of the feed works and the front cross shaft, can have an enlarged front opening through which the cross shaft and its gears can be removed and inserted. This opening is tightly closed by a removable cap or cover 95.

The cutter head trunnions are usually provided with means to supply the pinion shaft bearings in said trunnions, with a plentiful supply of oil, and surplus oil therefrom drains from the open inner ends of said trunnions into the oil containing gear case or housing of the cutter head in which the cutter blade carrying drum or annulus is mounted.

It is evident that various changes, modifications and variations might be resorted to without departing from the spirit and scope of my invention as defined by the claims, and hence I do not wish to limit myself to the exact disclosures hereof.

What I claim is:

1. In combination, a base, a head vertically swingable on its feed and return strokes and at one end fulcrumed to said base and at its opposite end provided with a non-rotary feed nut pivotally joined thereto to rock on a transverse axis, a cutting blade carried by said head and rotatable on a transverse axis arranged approximately midway between said fulcrum and said nut, the distance between said axis remaining fixed throughout the swing of said head, means for rotating said blade, a box mounted in the base to vertically rock on a transverse axis, a screw shaft extending through and rotatable in said nut and at one end mounted in said box against longitudinal thrust, said shaft and box being mounted to rock with said nut, and means for rotating said shaft in one direction to pull said head on its feed stroke and for rotating said shaft in the opposite direction to push said head on its return stroke.

2. In combination, a base, a head fulcrumed to said base on a transverse axis to swing on its feed and return strokes, a vertical non-rotary feed nut mounted in the free end of said head to rock on a transverse axis, a cutter blade carried by said head and rotatable on a transverse axis, means for rotating said blade, a box mounted in said base below said nut to rock on a transverse axis, an upright rotary screw shaft meshing with said nut and at its lower end mounted in said box against longitudinal movement and to rock with the box and nut, gearing in the box for rotating said shaft, a transverse shaft alined with the axis on which said box rocks for driving said gearing, and means for driving said transverse shaft in either direction and for changing the direction of rotation thereof to swing said head on its feed and return strokes.

3. In combination, a base, a head fulcrumed to said base to swing on a transverse axis, a rotary cutter blade carried by said head and provided with driving means, a box mounted in the base against vertical movement and to rock on a transverse axis, rotating gearing in said box, a transverse rotary shaft entering said box for driving said gearing and alined with the axis on which said box rocks, and meshing feed nut and feed screw members between said box and the free end of said head and actuated by said gearing for swinging said head on its feed and return strokes, one of said members being joined to said head against rotation and to rock on a transverse axis and the other member mounted in said box against longitudinal movement and to rock therewith and to be rotated in either direction by said gearing.

4. In combination, a base, a head fulcrumed to said base to swing vertically on its feed and return strokes and provided with a cutter blade rotating on a transverse axis and having driving means, a box mounted in the base to rock on a transverse axis and against vertical movement, and longitudinally-alined meshing nut and screw feed members between said box and the free end of said head to swing said head on its feed and return strokes, one of said members being non-rotary and joined to the free end of said head to rock on a transverse axis and to maintain a fixed distance from and relation to the axis of rotation of said blade, the other member being rotary and mounted in said box against longitudinal movement and to rock therewith in maintaining the longitudinal alinement of said members, and gearing for driving said rotary member in either direction.

5. A cutting off machine comprising a base having longitudinal side walls, means to horizontally support the stock extending transversely across the walls, a cutting off head between said walls and at its rear end having an axis supported by said walls and arranged transversely of the rear portions thereof, said head being vertically swingable on said axis, a rockable nut and coöperating swingable screw shaft between the front end of said head and said base for swinging said head vertically on its feed and return strokes, and a rotary cutter blade mounted in said head and having a center stock-receiving opening alined with said stock supporting means, said blade provided with actuating gearing comprising a shaft concentric with said axis.

6. A cutting off machine comprising a base including longitudinal vertical side walls provided with stock holding means and at their rear portions provided with alined bearings, a cutter head between said walls and intermediate its length provided with a rotary cutter blade to operate on stock held in said means and at its rear end provided with trunnions mounted in said bearings and on which the head is vertically swingable, feeding means applied to the front end of the head for swinging the same on its feed and return strokes, and means for driving said blade comprising a rotary drive shaft in and concentric with said trunnions and a rotary driving member mounted on a trunnion and a clutch between the same and said shaft.

7. A cutting off machine comprising a support, a cutting head provided with a rotary cutter blade and transverse horizontal trunnions mounted in said support and on which the head is swingable on its feed and return strokes, means for holding the stock in approximately the same horizontal plane as said trunnions, feeding means for swinging said head, and actuating gearing for said blade including a rotary drive shaft mounted in and extending through said trunnions and concentric therewith and having an extended end provided with power transmitting mechanism and another extended end provided with a shaft driving clutch, and a driving member concentric with said shaft and rotatively mounted on one of said trunnions and adapted to be thrown into and from driving relation with said shaft by said clutch.

8. A cutting off machine comprising a support, a cutting off head at one end provided with and supported by a horizontal axis carried by said support and at its other end provided with a vertical rockable feed nut, a vertically-disposed rockable rotary feed screw in said nut for swinging the head on said axis on its feed and return strokes, means for actuating said screw, and a rotary cutting off blade mounted in said head and provided with actuating gearing.

9. A cutting off machine comprising a base, a cutting off head having horizontal transverse trunnions mounted in said base, a peripherally-geared rotary annulus in said head and provided with a center opening rotary cutter blade, a rotary drive shaft concentric with and extending longitudinally through and mounted in said trunnions and transversely through said head and having a pinion in said head meshing with and driving said annulus, an annular shaft driving member fixed on an end of said shaft, a clutch carried by and for driving said member, manually controlled clutch operating means, a clutch driving wheel concentric with said shaft and carried by and rotatable on an extended end of one of said trunnions, and feed works for swinging said head vertically on its feed and return strokes.

10. A cutting off machine comprising a horizontally elongated base, a cutting off head arranged longitudinally thereof and at its rear end provided with horizontal alined trunnions mounted in the base and at its front end provided with a feed nut, a rotary feed screw applied to said nut to swing said head downwardly on its feed stroke and upwardly on its return stroke, feed works for actuating said screw and a rotary cutting off blade mounted in said head and provided with driving means including a rotary shaft entering the head and concentric with the trunnions.

11. A cutting off machine comprising a base, a cutting off head mounted in said base to swing on a transverse axis, the free end of said head provided with a pair of spaced arms having alined transverse bearings, a feed nut having alined lateral trunnions mounted in said bearings, a rotary feed screw passing through and rotatable in said nut, a rockable support for said screw, actuating means for the screw, a rotary cutting blade carried by said head, and means for driving said blade.

12. In combination, a base, a head fulcrumed to said base to swing vertically on its feed and return strokes and provided with a cutter blade rotating on a transverse axis and having driving means, a box mounted in the base to rock on a transverse axis and against vertical movement, and longitudinally-alined meshing nut and screw feed members between said box and the free end of said head to swing said head on its feed and return strokes, one of said members being non-rotary and joined to the free end of said head to rock on a transverse axis and to maintain a fixed distance from and relation to the axis of rotation of said blade, the other member being rotary and mounted in said box against longitudinal movement and to rock therewith in maintaining the longitudinal alinement of said members, said box being hollow and having a hollow trunnion alined with the axis on which said box rocks, a rotary shaft extending longitudinally through said trunnion, gearing in the box for rotating said rotary member from said shaft in either direction, and means for driving said shaft.

13. A cutting off machine comprising a base, a cutting-off head provided with a rotary cutter blade, said head being mounted in said base to swing vertically on a transverse axis, driving means for said blade, and means for swinging said head downwardly on its feed stroke and upwardly on its return stroke consisting essentially of a rockable feed nut and a rockable feed screw in said nut.

14. A cutting off machine comprising a base, a vertically swingable cutter head carried by said base and provided with a rotary cutter blade and operating means therefor, a feed nut pivotally mounted in the free end of said head, a rockable gear box mounted in the base, a rotary feed screw mounted in said box and rockable therewith and extending into and rotatable in said nut, gearing in said box for driving said shaft, and means for actuating said gearing.

15. A cutting off machine having its cutter head mounted on a transverse axis to swing vertically and provided with a center-opening rotary cutter blade, and feed works embodying an upright screw shaft and a nut longitudinally receiving the shaft, one of said members being held against rotation and longitudinally movable with respect to the other, the other member being rotatable, and means whereby the longitudinal axes of said members are maintained in alinement and are movable toward and from the axis on which said head swings, said machine embodying means to horizontally hold the stock extending through said opening of the cutter blade and arranged approximtely in the same horizontal plane as that of said axis whereby said head is swung downwardly on its feed stroke and upwardly on its return stroke.

16. A cutting off machine comprising a base, a cutter head provided with a rotary center-opening cutter blade, said head provided with a hollow trunnion rigid therewith and mounted in the base and on which the head is vertically swingable, feed works for swinging said head, a rotary drive shaft mounted in and extending longitudinally through and projecting beyond said trunnion and geared to said blade for driving the same, actuating means applied to said shaft for driving the same, and consisting of a rotary wheel concentric with said shaft and loosely mounted on said trunnion and a clutch for establishing shaft driving connection between said wheel and said shaft and provided with manually controlled operating means, and transmission means from said shaft to said works for driving the same.

17. A cutting off machine comprising a base, a cutter head provided with a rotary center-opening cutter blade, said head provided with alined hollow oppositely extending trunnions rigid therewith and mounted in and extending beyond the base and on which the head is vertically swingable on its feed and return strokes, a rotary drive shaft mounted in and extending through and beyond said trunnions and geared to said blade for rotating the same, feed works for swinging said head, a rotary driving member loosely mounted on one of said trunnions, a clutch mechanism for throwing said member into and out of driving connection with said shaft, and feed works actuating transmission mechanism extending from a projected end of said shaft.

18. A cutting off machine comprising a base, a cutter head mounted in said base to swing vertically on a transverse axis and provided with a rotary center-opening cutter blade and gearing for rotating the same, a rotary drive shaft arranged concentrically with respect to said axis and having a pinion for actuating said gearing, feed works for swinging said head on its feed and return strokes, a rotary driving member for said shaft loosely mounted with respect thereto and concentrically therewith, said shaft having a projected end provided with a clutch for throwing said shaft into and from driven connection with said member, said shaft having an opposite projected end having a driving connection to operate said feed works to swing said head on its feed stroke and another driving connection for operating said feed works to swing said head on its return stroke.

19. A cutting off machine having a trunnion on which the head is vertically swingable on its feed and return strokes, and feed works for swinging said head provided with a longitudinally movable rod and means controlled thereby for throwing said works into and out of action, said trunnion provided with a radially projected arm arranged to move said rod longitudinally, substantially as described.

20. In combination, a base, a vertically swingable cutter head mounted therein and provided with a rotary cutter blade, a rotary shaft for driving said blade, said shaft arranged concentric with the axis on which said head swings, a feed nut and screw for swinging said head on its feed and return strokes, a cross shaft for actuating the same, a longitudinal shaft geared to and driving the cross shaft, a constantly rotating gear having a driving connection from said blade driving shaft, a clutch mechanism for operatively connecting said gear to and for disconnecting the same from said longitudinal shaft, another constantly and oppositely rotating gear having a driving connection from said blade driving shaft, and a clutch mechanism for operatively connecting said last mentioned gear to said longitudinal shaft and for disconnecting the same therefrom.

21. In combination, a base, a head fulcrumed to the base to swing vertically and provided with a rotary cutter blade, one end of said base provided with alined transverse bearings, a box having alined trunnions mounted in said bearings and on which the box is rockable, a feed nut and screw connection between said box and the free end of said head for swinging said head on its feed and return strokes, a shaft extending longitudinally through and rotatable in one of said trunnions and geared to said connection to actuate the same, and means for rotating said shaft.

22. In combination, a base, a head fulcrumed thereto to swing on its feed and return strokes and provided with a rotary cutter, a feed nut pivoted to said head to rock on a transverse axis, a rotary feed screw meshing with said nut and coupled to said base against longitudinal movement and to rock on a transverse axis in maintaining its alinement with said nut, a shaft alined with the axis on which said screw rocks, gearing from said shaft to said screw for rotating the screw in either direction, and means for rotating said shaft.

23. In combination, a base having a depressed end extension provided with transverse bearings, a vertically swingable head at one end fulcrumed to the opposite end of the base from said extension and provided with a rotary cutter blade, an upright feed nut mounted in the free end of the head to rock on a transverse axis, a box provided with trunnions mounted and rockable in said bearings, a rotary feed screw meshing and alined with said nut and at its lower end mounted in said box to rock therewith, and gearing for rotating said screw.

24. In combination, a base, a head provided with a rotary cutter blade, said head being fulcrumed at one end to said base to swing vertically on an axis arranged transversely of the upper portion of one end of said base, the free end of said head provided with an upright feed nut pivoted thereto to rock on a transverse axis, an upright rotary feed screw meshing and alined with said nut and at its lower end pivotally coupled to the other end of said base against longitudinal movement and to rock on an axis transversely of and arranged at the lower portion of the base, and gearing applied to the lower end portion of said screw for rotating the same in either direction.

25. In combination, a base, a swingable head fulcrumed thereto, a box mounted in the base to rock on a transverse axis, a feed nut and screw connection between said box and the head for swinging the head on its feed and return strokes, and a rotary shaft extending into the box in alinement with said axis and geared to said connection for operating the same to swing said head.

26. In combination, a base, a head carried thereby and provided with a rotary cutter blade, a rotary feed screw having operative connection with said head to move the same on its feed and return strokes, a box in which said screw is mounted having a trunnion, a rotary cross shaft mounted in said trunnion and geared to said screw to rotate the same, a gear box having a tubular extension secured in said base and longitudinally receiving said trunnion, a drive shaft extending into said gear box, and gearing in said box between said drive shaft and cross shaft.

27. In combination, a base, a head carried thereby and provided with a rotary cutter blade, a rotary feed screw having operative connection with said head to move the same on its feed and return strokes, a box in which said screw is mounted, said box having alined trunnions coupled to the base, a rotary cross shaft mounted in and extending through one of said trunnions and geared to said screw for rotating the same, an exterior gear box having a tubular extension removably secured in the base and longitudinally and removably receiving one of said trunnions, and feed works comprising a drive shaft for said cross shaft and geared thereto within said gear box.

28. In combination, a base, a head carried thereby and provided with a rotary cutter blade, a rotary feed screw having operative connection with said head to move the same on its feed and return strokes, a box in which said screw is mounted, said box being mounted against vertical movement, an exterior gear box provided with and supported by a tubular extension, means clamping said extension to the base, a rotary cross shaft arranged longitudinally of said extension and geared to said screw within its box to rotate the screw, and feed works comprising a shaft extending into said gear box and therein geared to said cross shaft to drive the same.

29. In combination, a base, a head carried thereby and movable on its feed and return strokes and provided with a rotary cutter, a feed screw operatively coupled to said head to move the same on its strokes, a cross shaft mounted in the base and geared to said screw for rotating the same in either direction, a longitudinal shaft at the exterior of the base, a gear box at the exterior of and secured to the base and receiving one end of said longitudinal shaft and the outer end of said cross shaft, gearing in said box connecting said shafts, a feed works box arranged at the exterior of and secured to said base and receiving the other end of said longitudinal shaft, reversing gear feed works for said longitudinal shaft and arranged in said feed works box, means for driving said feed works, and shifting means therefor controlled by the movement of said head.

30. In combination, a base, a head carried thereby and movable on its feed and return strokes and provided with a rotary cutter, a feed works box provided with and supported by a tubular extension, means clamping said extension to the base, reversing gear in said box, a shaft extending longitudinally through said extension and rotated in either direction by said gear, rotary means for actuating said head on its strokes, and gearing for driving said means from said shaft.

31. In combination, a base, a head carried thereby and movable on its feed and return strokes and provided with a rotary cutter, means for moving said head on its strokes comprising feed works embodying rotary gears and shafts and a gear box provided with and supported by a tubular extension longitudinally receiving one of said shafts, said box being arranged at the exterior of the base, said base provided with means for clamping said extension thereto.

32. In combination, a base, a head carried thereby and swingable on a transverse axis on its feed and return strokes and provided with a rotary cutter, feed works for actuating said head on said strokes comprising shifting means for reversing and controlling said feed works, and a projected arm swinging with said axis for actuating said shifting means.

In testimony whereof I affixed my signature in the presence of two witnesses.

GEORGE GORTON.

Witnesses:
G. E. GUSTAFSON,
P. M. HENKES.

Copies of this patent may be obtained for five cents each, by addressing the "Commissioner of Patents, Washington, D. C."